United States Patent
Long et al.

(10) Patent No.: US 9,323,246 B2
(45) Date of Patent: Apr. 26, 2016

(54) SYSTEM, CONTROLLER AND METHOD FOR SYNCHRONIZED CAPTURE AND SYNCHRONIZED PLAYBACK OF DATA

(75) Inventors: David Long, Hertfordshire (GB); Gerald Jung, Lautertal-Gadernheim (DE); Gerhard Löschner, Griesheim (DE); Paul Hayford, Herne Villa (GB); Andrew Moulden, High Wycombe (GB)

(73) Assignee: ILLINOIS TOOL WORKS INC., Glenview, IL (US)

(*) Notice: Subject to any disclaimer, the term of this patent is extended or adjusted under 35 U.S.C. 154(b) by 637 days.

(21) Appl. No.: 12/682,715

(22) PCT Filed: Nov. 21, 2008

(86) PCT No.: PCT/GB2008/003908
§ 371 (c)(1),
(2), (4) Date: Oct. 19, 2010

(87) PCT Pub. No.: WO2009/066083
PCT Pub. Date: May 28, 2009

(65) Prior Publication Data
US 2011/0054823 A1    Mar. 3, 2011

(30) Foreign Application Priority Data

Nov. 23, 2007  (GB) .................................. 0723039.4

(51) Int. Cl.
*G01D 9/28* (2006.01)
*G05B 23/02* (2006.01)
(Continued)

(52) U.S. Cl.
CPC ......... *G05B 23/0256* (2013.01); *G01M 17/007* (2013.01); *G05B 17/02* (2013.01); *G05B 2219/23446* (2013.01); *G05B 2219/25367* (2013.01)

(58) Field of Classification Search
CPC ........... G05B 2219/2637; G05B 17/02; G05B 23/0237; G05B 23/0256; G05B 2219/24042; G05B 2219/25367

USPC .................. 702/108, 125; 73/116.05–116.11
See application file for complete search history.

(56) References Cited

U.S. PATENT DOCUMENTS 3,926,043 A * 12/1975 Marshall et al. ........... 73/116.06
4,186,593 A *  2/1980 Watanabe .................. 73/118.01
(Continued)

FOREIGN PATENT DOCUMENTS

DE    10047082    5/2001
DE    10342909    4/2005
(Continued)

OTHER PUBLICATIONS

EE Herald, Controller Area Network (CAN) interface in embedded systems, http://www.eeherald.com/section/design-guide-esmod9.html, 2006, last accessed Jul. 31, 2013.*
(Continued)

*Primary Examiner* — John Breene
*Assistant Examiner* — Timothy H Hwang
(74) *Attorney, Agent, or Firm* — McCarter & English, LLP

(57) ABSTRACT

Provided are a method, a test system and a microcontroller (40), for use in a test system for testing vehicles and automotive components. Control signals that are generated by active components within a vehicle during a test drive are sampled and played back to a specimen vehicle within a laboratory test environment, and the control signals are played back synchronously with data representing conditions and events such as loads, acceleration and displacements that are experienced during the test drive. A microcontroller (40) is provided to buffer control signal data and to synchronize playback of the control signals via a CAN (60) bus within the specimen test vehicle in response to trigger signals.

8 Claims, 6 Drawing Sheets

(51) Int. Cl.
*G05B 17/02* (2006.01)
*G01M 17/007* (2006.01)

(56) References Cited

U.S. PATENT DOCUMENTS

| | | | |
|---|---|---|---|
| 5,315,882 | A | 5/1994 | Meyer et al. |
| 5,610,330 | A | 3/1997 | Fricke et al. |
| 6,397,132 | B1 * | 5/2002 | Liu .................................. 701/36 |
| 7,269,482 | B1 | 9/2007 | Shultz et al. |
| 2002/0018982 | A1 | 2/2002 | Conroy |
| 2004/0044797 | A1 | 3/2004 | Kinowski et al. |
| 2006/0104371 | A1 * | 5/2006 | Schuermans et al. ......... 375/257 |
| 2007/0260373 | A1 * | 11/2007 | Langer et al. .................... 701/29 |
| 2010/0256861 | A1 * | 10/2010 | Hodges ............................ 701/33 |

FOREIGN PATENT DOCUMENTS

| | | |
|---|---|---|
| EP | 1452969 | 9/2004 |
| EP | 1806636 | 7/2007 |
| FR | 2845497 | 4/2004 |
| GB | 2053819 | 2/1981 |
| GB | 2 273 564 | 6/1994 |
| GB | 2273564 | 6/1994 |
| JP | 3963092 | 4/2003 |
| JP | 2003121310 A * | 4/2003 |
| JP | 2004019508 | 1/2004 |
| JP | 2004361292 | 12/2004 |
| JP | 2005351649 | 12/2005 |
| JP | 4577090 | 11/2010 |
| WO | 94/19784 | 9/1994 |
| WO | 95/28783 | 10/1995 |
| WO | 9921120 | 4/1999 |
| WO | WO 9921120 A1 * | 4/1999 |
| WO | 2007/025054 | 3/2007 |
| WO | 2007/133601 | 11/2007 |

OTHER PUBLICATIONS

Definition of bus, What is bus ?—A Word Definition From the Webopedia Computer Dictionary, http://www.webopedia.com/TERM/B/bus.html, (last accessed Jan. 27, 2014).*

Canbus, What is Canbus, http://canbuskit.com/what.php, (Feb. 6, 2006).*

* cited by examiner

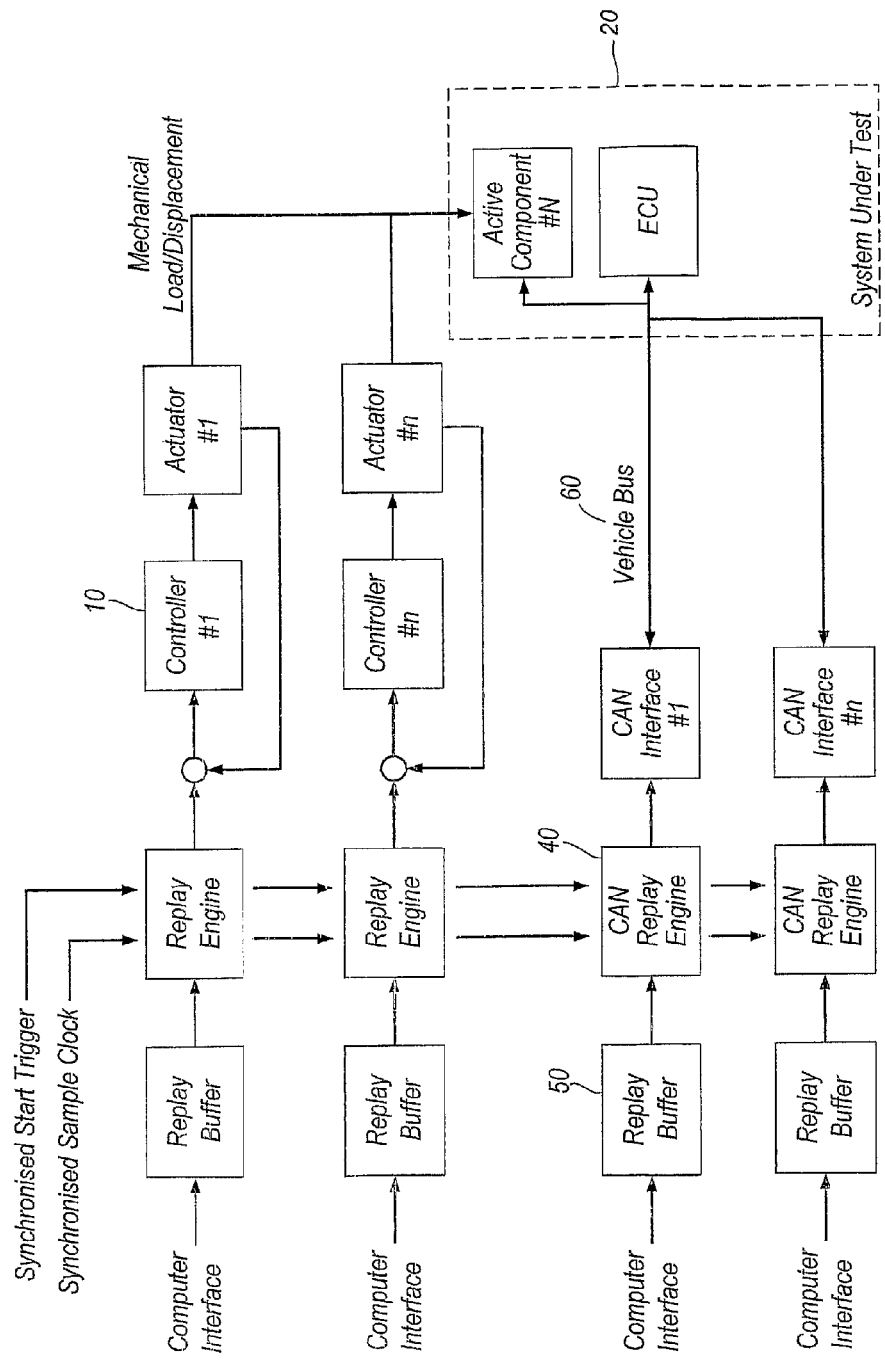
Fig. 3 Synchronised replay system

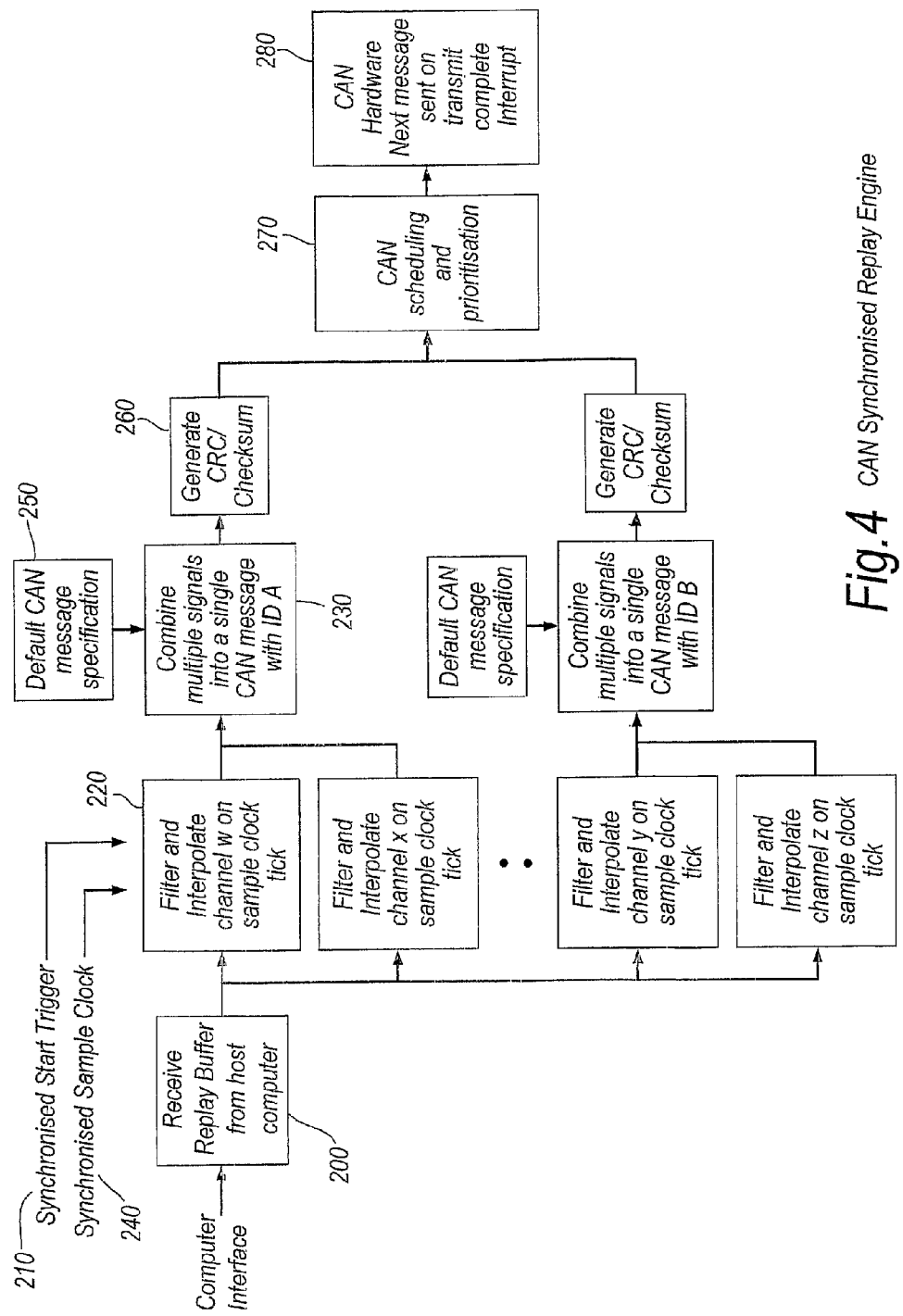
Fig. 4 CAN Synchronised Replay Engine

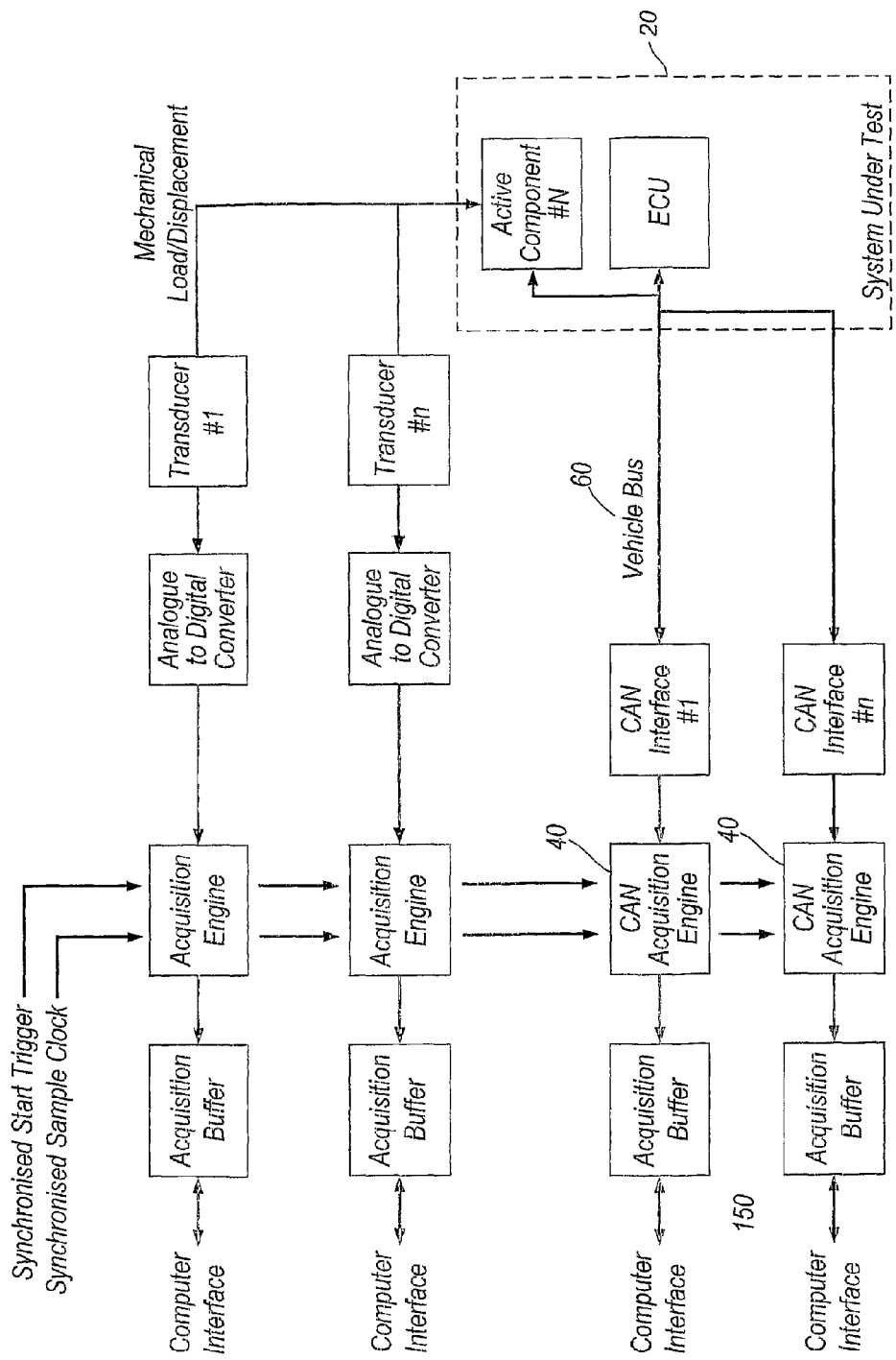
Fig. 5 Synchronised acquisition system

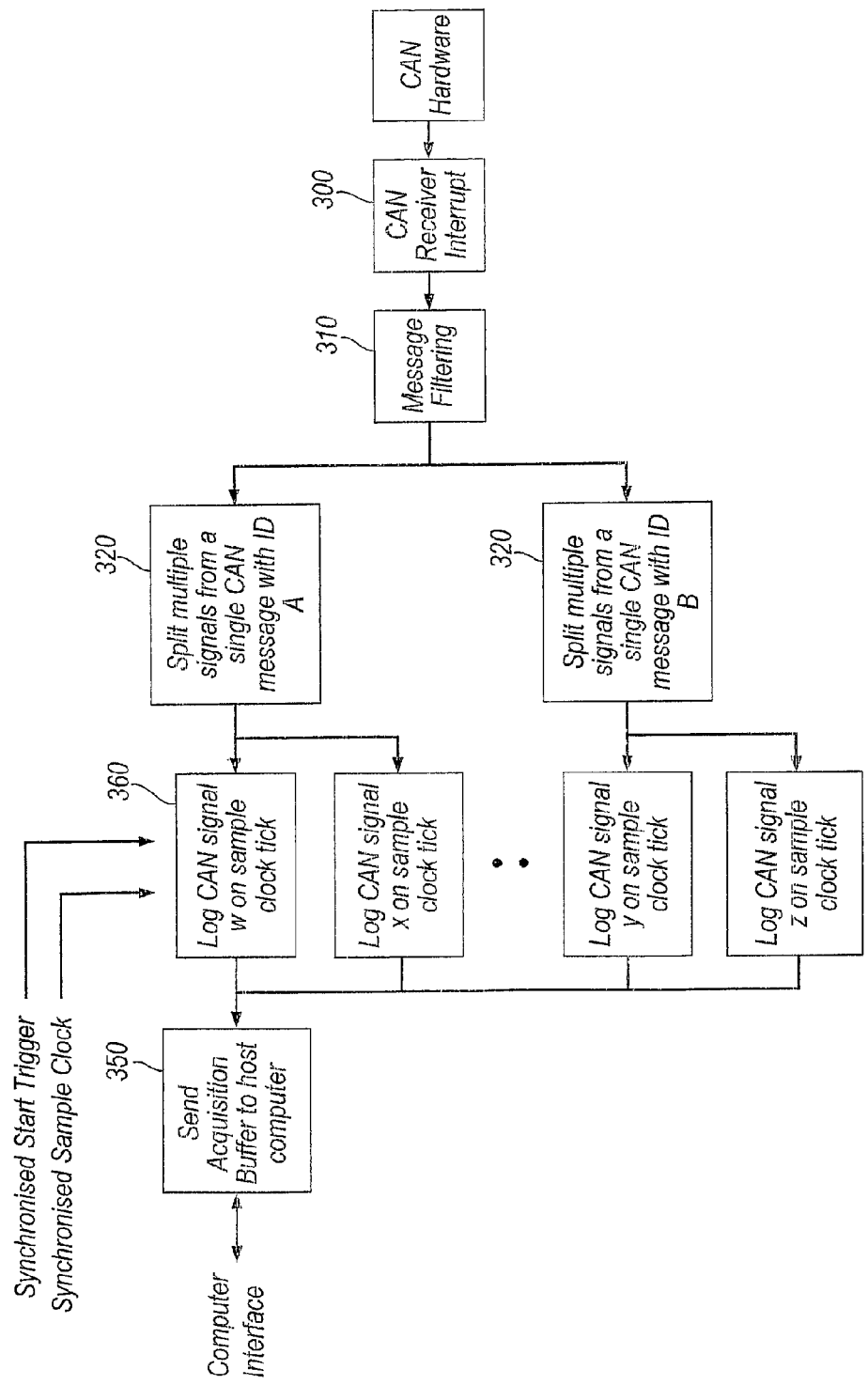
Fig. 6  CAN Synchronised Acquisition Engine

SYSTEM, CONTROLLER AND METHOD FOR SYNCHRONIZED CAPTURE AND SYNCHRONIZED PLAYBACK OF DATA

FIELD OF INVENTION

The present invention provides apparatus and methods for use in the synchronized capture and synchronized playback of data, such as for synchronizing CAN messages or FlexRay™ messages with other data within a testing environment.

BACKGROUND

A growing number of electronic systems are being built into vehicles to provide advanced features such as electrically assisted steering, ABS and active suspension components. These systems communicate over serial buses, such as a Controller Area Network (CAN) bus and, more recently, a FlexRay system bus.

Automotive manufacturers perform durability testing of vehicles and vehicle components (test specimens) in the laboratory by replaying data, measured during track test drives with specially instrumented vehicles, using hydraulic actuators to apply the equivalent loads and accelerations to the test specimens under the control of sophisticated software and hardware.

In the past, this testing has been limited to the analogue signals that are generated by monitoring vehicle behaviour and conditions that affect that behaviour, such as loads and accelerations at various points on the vehicle. This has been adequate for conventional test specimens without active components. However, the behaviour of modern vehicles is also dependent on the control data on the serial buses. For example, during a test drive, an in-car computer may determine the need to give feedback to a driver that the vehicle is close to its traction limit, or sensors within the vehicle may determine the need to stiffen a particular strut. Control signals are sent via the CAN bus to dynamically control the relevant vehicle components.

The inventors of the present invention have determined that known systems are unable to provide effective testing for vehicles that include active controls, since they fail to take full account of the control signals and their interaction with other components within the vehicle.

SUMMARY

The inventors of the present invention have determined that effective testing of vehicles and of automotive components within a laboratory test environment requires replay to a test specimen of active control signals that were generated within a vehicle during use. For example, a vehicle may have active ride control which adjusts suspension settings during use of the vehicle. In particular, the inventors have determined that these active control signals must be replayed synchronously with the replay of data that represents the conditions (loads, acceleration and other events) that were experienced by vehicle components during use of the vehicle.

The inventors have determined that the active control signals that are associated with conditions experienced during a vehicle test drive are an important part of the context in which the behaviour and performance of automotive components should be tested. Such control signals and other data are output by sensors and control systems within a vehicle during field tests, and so the control signals can be sampled and timestamped and saved in association with data representing the respective conditions experienced during such field tests. The present invention enables those control signals to be replayed within a test environment synchronously with the associated monitored conditions data. This can achieve an improved correlation between conditions experienced during field trials and conditions reproduced in the laboratory, leading to more effective laboratory testing.

A first aspect of the present invention provides a method of testing specimen vehicle components, comprising the steps of: storing first data representative of conditions experienced by a vehicle, and/or representative of the action of components of the vehicle, during a test drive of the vehicle; storing second data representative of control signals on a data bus of the vehicle during the test drive; replaying the first data and applying the first data to equipment to simulate a test drive for a vehicle under test; replaying the second data and applying the second data to the data bus of the vehicle under test; and synchronizing the replaying of the first and second data.

One embodiment of the invention provides a method for testing specimen automotive components, comprising the steps of: receiving, as inputs to a test system, a first set of data inputs representing vehicle control bus signals that were recorded during a vehicle test drive and a second set of data inputs representing conditions experienced by the vehicle during the vehicle test drive; and replaying, to a test specimen apparatus, the data representing monitored vehicle control bus signals synchronously with the data representing respective associated conditions.

In one embodiment of the invention, the test system comprises an apparatus for simulating use conditions when performing test operations on a specimen apparatus. The test specimen apparatus may comprise, for example, a vehicle within a test system that comprises a comprehensive vehicle testing rig that provides means for monitoring vertical, longitudinal and lateral loads and for monitoring braking, steering and camber movements. Equally, the test specimen apparatus may comprise a vehicle within a road simulation system for testing durability, noise and vibrations; or the test specimen apparatus may comprise a vehicle subsystem and the test system may be a track and wheelbase testing system. Various examples of testing systems are known and available from Instron Structural Testing Systems GmbH and others. Typical known systems have not provided full integration of sensor data and control signals and, in particular, have not provided synchronised replay of analog test data and digital control signal data within a laboratory test environment.

In an embodiment of the invention, conditions and events are monitored by capturing and storing analogue signals that are provided by sensors within a vehicle during a test drive. The analogue signals are input to a computer system within the vehicle and are stored for subsequent use. Meanwhile, monitoring of the active control signals may be implemented by sampling digital signals on a control signal bus, such as a serial CAN bus or a FlexRay system bus, within the vehicle. Sensors and control devices within a vehicle may transmit CAN messages via the CAN bus to control actuators that are each capable of performing a set of actions on particular vehicle components, and these CAN messages are a significant part of the context within which the vehicle's behaviour and performance should be interpreted. Automotive testing according to the present invention takes account of both the monitored data representing experienced conditions and associated control signals. The two sets of associated data are replayed to a test system and applied to a test specimen in a synchronous manner to enable the test specimen to experience the same set of conditions and control signals and in the same time sequence as a test-driven vehicle.

A second aspect of the invention provides a controller device for a test system in which it is desired to test the combined effects on a test specimen apparatus of certain conditions and associated control bus signals. The controller device comprises at least one buffer into which previously-captured control bus signals can be loaded. The controller device is responsive to a trigger signal to initiate playback onto a control bus within the test system of previously-captured control bus signals. This playback to the test system control bus is synchronized with playback of data representing other conditions that were previously recorded synchronously with the control bus signals. A high speed link enables a set of controller clocks to be synchronized between, for example, a digital microcontroller that initiates digital control signal playback and a separate controller that initiates playback of the data representing experienced conditions.

In one embodiment, the controller device comprises a high performance microcontroller comprising a set of buffers and a built-in CAN interface, a field programmable gate array (FPGA) with a high speed (e.g. fibreoptic) link to a first data processing system storing data representing monitored conditions such as loads and displacement, and a connection (e.g. an Ethernet connection) for receiving control data from an application program running on a second data processing system. The microcontroller's CAN interface comprises means for scaling and time shifting control data and building CAN messages that contain the control data within the message payload. Playback of the control data is then deferred until a trigger event occurs, enabling the playback of control data via a CAN bus to be synchronized with playback of associated data representing monitored conditions. The high speed link is used both to synchronize clocks between the microcontroller and the first data processing system, and to enable precisely timed playback of the data representing monitored conditions.

A third aspect of the invention provides a test system comprising:
  a test rig comprising means for supporting a test specimen apparatus and a set of actuators for applying a set of physical conditions (loads, acceleration and other events) to the test specimen apparatus;
  means for replaying data representing previously monitored conditions to the set of actuators to reproduce the previously monitored conditions; and
  a controller device comprising: at least one buffer memory into which data representing previously-monitored control bus signals can be loaded; means, responsive to a trigger signal, to initiate playback onto a control bus within the test system of the previously-monitored control bus signals; and means for synchronizing the playback of control bus signals with playback of other data representing monitored conditions that was previously captured synchronously with the control bus signals.

BRIEF DESCRIPTION OF DRAWINGS

Embodiments of the invention are described below in more detail, by way of example, with reference to the accompanying drawings in which:

FIG. 3 is a schematic representation of a synchronised replay system according to an embodiment of the invention;

FIG. 4 represents a CAN synchronised replay engine according to an embodiment of the invention;

FIG. 5 is a schematic representation of a synchronised acquisition system according to an embodiment of the invention; and FIG. 6 represents operations performed within a CAN synchronised acquisition engine according to an embodiment of the invention.

DESCRIPTION OF EMBODIMENTS

Known automotive testing methods use a test vehicle that is instrumented with various data capture devices such as load and acceleration sensors. These sensors are connected to a computer within the test vehicle to capture data representing the loads and displacements and other conditions experienced during test drives. This captured data can then be loaded onto a computer system, the data typically being stored within the vehicle's on-board computer system storage and subsequently transferred to a test environment control system for playback.

Figure 1:
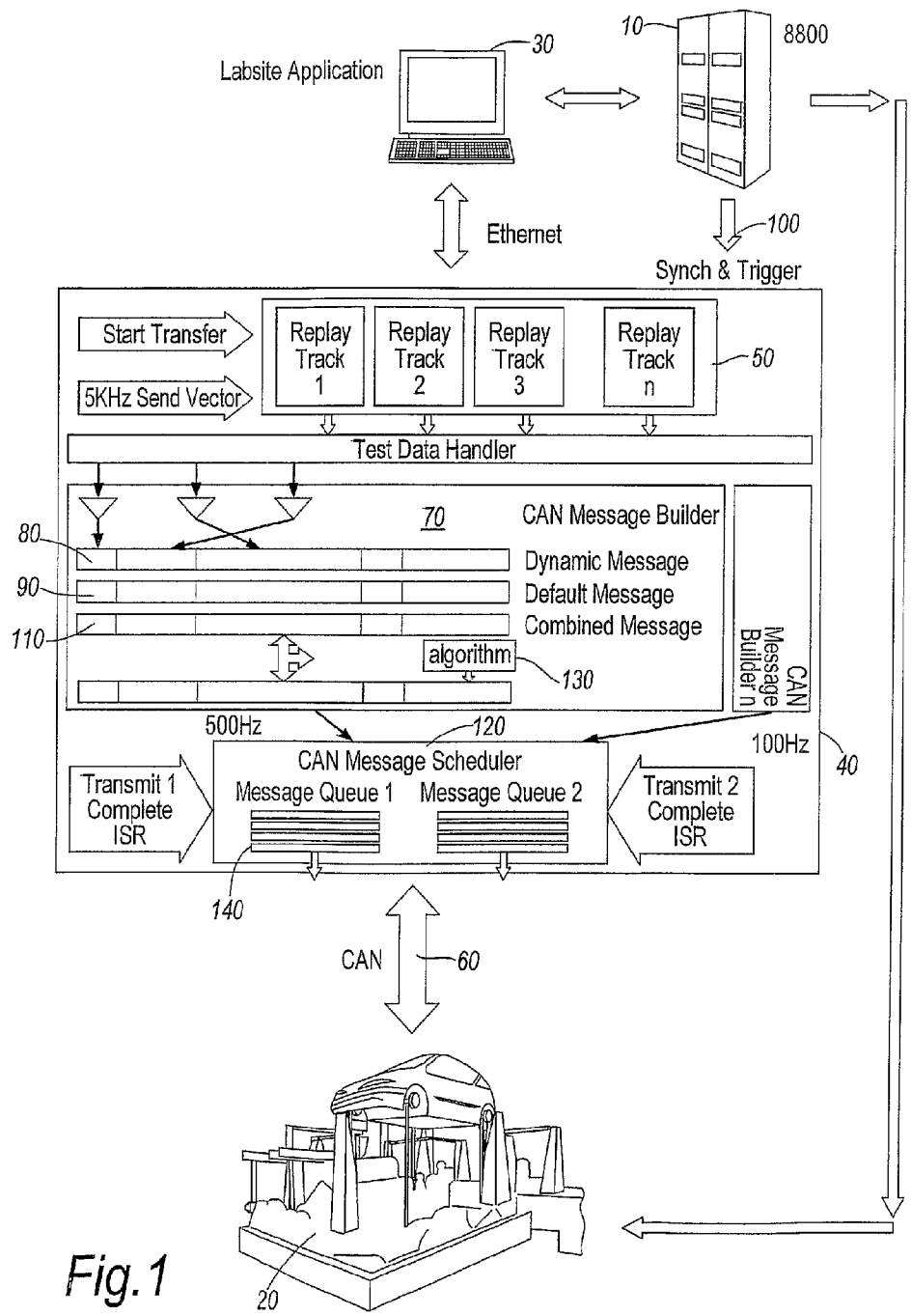
FIG. 1 is a schematic representation of an automotive testing environment showing the components involved in the creation of CAN messages and synchronous playback of digital data and analogue data, according to an embodiment of the invention.

A suitable control system is the Labtronic™ 8800 multi-axis digital controller from Instron Structural Testing Systems GmbH that can control a large number of separate actuators. This control system 10 is an integral part of an automotive test system as shown in FIG. 1, and is adapted to play back to the test system in the laboratory the data representing loads and displacements that was previously captured within a test vehicle during an earlier test drive. The replayed data controls a set of actuators within a test rig 20, to reproduce within the test system the loads, displacements and other conditions that were monitored during the test drive. By reproducing, within a laboratory setting, actual monitored conditions, better testing of a test specimen vehicle or vehicle subsystem is achieved.

The Labtronic 8800 controller is connected to a personal computer 30 running software for controlling a testing environment, such as the RS Labsite™ software from Instron. These components cooperate to provide a system having the features required for laboratory testing using analogue signals that represent monitored loads and displacement.

However, known automotive test systems have not previously provided optimal integration of control data that is generated dynamically by active control components, including an in-vehicle computer system, in response to sensors and monitored components within the vehicle. Such control data is often implemented as Controller Area Network (CAN) messages that are transmitted between sensors, actuators and control devices within a vehicle via a CAN bus. Disregarding the control signals that are generated by these active components would result in an inability to accurately reproduce the situation experienced by a modern test-driven vehicle, such that the test results would be invalid and may result in damage to the test vehicle that is not representative of the real effects of the conditions experienced during the test drive.

A Controller Area Network (CAN) is a serial bus standard that was originally developed in the 1980s for connecting automotive electronic components, and has been used for connecting devices such as sensors, actuators and controllers within vehicles and other automated systems. A CAN bus may connect an engine control unit with a vehicle's transmission, or may connect an air conditioning system with a thermometer and humidity monitor. The various different components (the 'nodes' of the CAN) send and receive CAN messages via the serial bus. Each node such as a sensor, actuator or control device requires a host processor for interpreting received messages, and a CAN controller comprising a hardware controller with a synchronous clock. The CAN controller stores received bits from the bus until an entire message is available for the host processor to process (e.g. after the CAN controller has triggered an interrupt), and the host processor stores its transmit messages into a CAN controller for transmitting serially onto the bus.

To provide improved testing of vehicles, and other components and systems, the present invention provides a solution for synchronous playback of control signals and the associated data representing conditions and events experienced by a test driven vehicle, to ensure that a test specimen apparatus within the laboratory receives synchronised inputs that are an accurate representation of the data captured during a test drive or other field trials.

Figure 2:
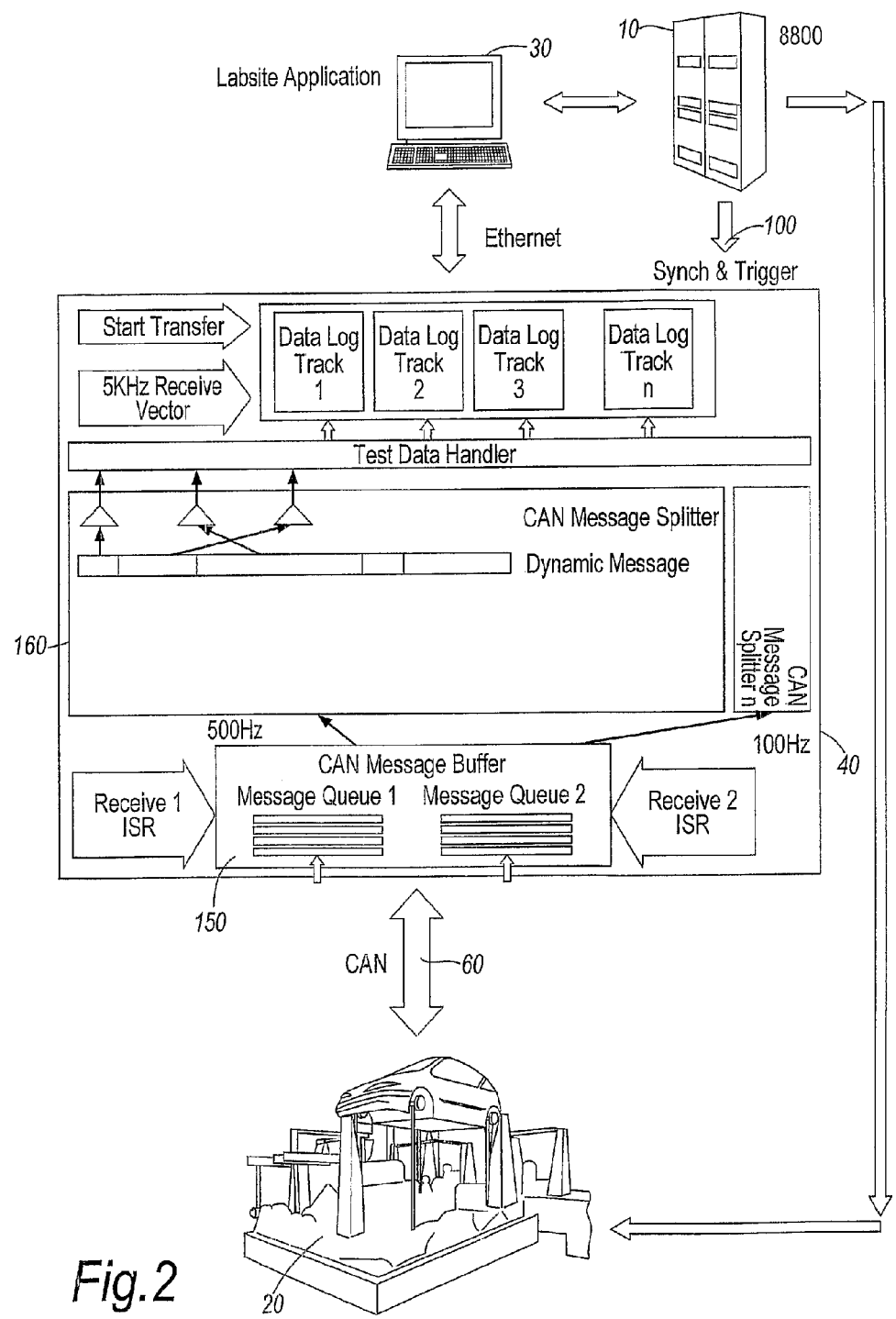
FIG. 2 is a schematic representation of the automotive testing environment of FIG. 1, showing components involved in synchronous data acquisition, according to an embodiment of the invention.

The solution according to an embodiment of the present invention includes a new component, referred to herein as the CANStaq product, that allows CAN signals to be treated in the same way as analogue signals. The CANStaq controller 40 is a high performance microcontroller with built in CAN interfaces, a field-programmable gate array (FPGA) with a high speed fibre optic link to a conventional digital controller 10 (such as the Labtronic 8800 controller), and an Ethernet connection to the personal computer 30 that is running the RS Labsite application software. The major components of the CANStaq controller 40 and other elements of a test system according to an embodiment of the invention are shown in FIGS. 1 and 2. More detail of the replay system is shown in FIG. 3, with details of the CANStaq controller in FIG. 4. CAN synchronized acquisition is shown in FIGS. 5 and 6.

CAN signals that are generated by active components within a vehicle during a test drive can be replayed to components within a test specimen apparatus synchronously with existing analogue signals. Without this synchronization, small differences in electronic component tolerances will cause the sampled control signals and the analogue signals to drift out of phase when the two sets of data are replayed. For example, using the synchronization method described herein, suspension stiffness can be set over the CAN bus at the same time as the load is applied to the suspension. Without this synchronisation, loads may be applied at the incorrect stiffness, which will result in incorrect test results and possible specimen damage.

The replay system parameters, such as test limit values and actions, and control loop gains, are defined using a command interface accessible over an Ethernet link, and the parameters are stored on the test control computer 30. This replay system with its high speed link allows large quantities of replay data to be periodically transferred to the CANStaq controller.

When a replay session is required the system is prepared, defining how the playback data should be converted into CAN messages by combining dynamic signals from the playback buffer with static signals defined in the default CAN message buffer. These settings can be made using the command interface.

Playback data is preloaded into buffers 50 on the CANStaq microcontroller 40 via the Ethernet connection. The playback signal buffers each contain one or more playback tracks that are sent 200 to the CANStaq controller over the Ethernet interface in normalised form. At this stage, the tracks are unallocated to particular CAN messages. The CANStaq microcontroller then waits on a trigger 210 before starting to send data onto the CAN bus 60. The Message builder 70 is responsible for taking the normalised signals, scaling and packing 220 the scaled signals into the CAN message bit locations as specified by rules defined by the CANStaq user. In this embodiment, a user-specific CAN database is used to specify how the playback signals are converted 230 into a sequence of one or more CAN messages. The message builder is preconfigured with the information required to format the CAN message 80 using the Ethernet interface which is used to specify the message ID, start bit, the bit length and the scaling factor for each signal. These playback signals are dynamic as they change at every sample tick. The message builder also allows static signals 90 to be added to the CAN messages which are fixed bit patterns which do not change on the sample tick. These static values are specified using the Ethernet interface.

It is necessary, for synchronous playback of CAN signals with Labtronic 8800 analogue signals to send synchronisation information 100 to each CAN playback device allowing data to be played at the same instant in time from each device. The CAN playback devices are connected to the Labtronic 8800 controller by a fibre optic communication ring. Each node in the ring has an independent clock oscillator and therefore the nodes may drift out of synchronization over time. To avoid this drift, the high speed serial data is tagged with a flag to indicate when an 8800 sample occurs. This information is recovered at each node using a phased locked loop and delay compensation to provide a simultaneous sample tick on each device. The sample clock 240 is a system wide hardware signal communicated in the same manner as the trigger signal that accurately marks time at a fixed frequency, typically generated at a frequency of 5 kHz. The CAN playback system can be set to operate at any rate lower than this value. The sample tick refers to the sub-sampled value.

Once the CAN messages 110 have been specified, the system is prepared to start pending a trigger signal. This makes sure that all set up is completed before replay commences. The trigger signal is sent via a hardware link between the different hardware subsystems, implemented with wired connections, fibre optic link or another similar communication mechanism. This link is preferably a fibreoptic ring. The Labtronic 8800 controller 10 is a master sub system that initiates the trigger in response to a command from the application computer 30, which is then broadcast to the other subsystems simultaneously using the hardware link.

When the trigger is received, each of the subsystems (the CANStaq controller with its replay buffer and replay engine, and another controller for playback of the data representing experienced conditions) start replaying data at each sample clock tick. When the sample clock tick occurs, the Message builder 70 takes the next value from each playback buffer in turn and, using the preconfigured information, scales and shifts the signal into its correct location and size in the CAN message. In the present embodiment, a vector of data is taken from the playback buffer, filtered and resampled 220 from the playback buffer rate to the sample clock rate. Each vector contains several normalised CAN signals. Each CAN signal can be issued onto the CAN bus at a pre-specified rate. If it is time to transmit, then each signal is multiplied and bit shifted into its correct location in the CAN message payload (defined by the user's CAN database). The combined signals form a CAN message 80. Any messages that are not fully specified with dynamic signals from the replay buffers are completed with data from the default message buffer 90. The default message buffer can be changed at any time allowing signals to changed independently from the replay buffer.

Completed messages 110 are passed to the CAN scheduler 120 which buffers them 270 in priority order based on the CAN message ID. Messages are issued to the CAN interface under the control of the CAN transmit complete interrupt until the buffer is empty.

As noted above, parts of the message can be defined as dynamic signals that will change for every sample clock tick, and other parts of the message can be defined as static and will be the same from sample to sample. The static parts can be defined asynchronously from the command interface, for example, 'ignition on' is a static signal which changes infrequently. A user specified algorithm 130 can be optionally applied 260 to each CAN message at this point, e.g. to add additional security information to the message, such as data integrity checks. This can be done on a message-by-message basis. The message is then added to a queue 140 for issuing onto the CAN bus hardware. The message builder 70 then processes the next CAN message ID. The Message builder processes each CAN message ID in priority order.

It is possible for a CAN message be completely specified from static values which will cause the same value to be issued every sample tick (This is often required by CAN devices to show the bus is still working correctly). A user specified algorithm 130 can be applied to such a message.

CAN message transmission 280 starts on reception of the sample tick (subject to processing delays) with the highest priority CAN message first. This message will be issued onto the CAN bus by the dedicated CAN controller hardware. Further CAN messages will be built and queued awaiting completion of the first message send (indicated by a processor interrupt). The next highest priority message will then be issued onto the CAN bus. This is repeated until all messages have been sent. This sequence is repeated on every clock tick.

The CANStaq microcontroller 40 thus makes use of a fibre-optic link for multiple purposes. Firstly, it continually resynchronizes the CANStaq microcontroller clocks to the Labtronic 8800 controller clocks. This synchronisation mitigates the aforementioned problem that small differences in electronic component tolerances would otherwise cause the CANStaq microcontroller playback data to slowly drift out of phase with the rest of the system. Secondly, it provides a method of starting playback at precisely the same time as the Labtronic 8800 controller starts its playback. The CANStaq is also able to stop playback synchronously with the Labtronic 8800 controller. For the CAN signals, the user can configure which signal should be faded and which should not, during the start and stop phases.

The CANStaq microcontroller also has the capability to acquire data from the CAN bus synchronously with data acquisition by the Labtronic 8800 controller. CAN signals for acquisition are set up in a similar fashion to the replay described above, as shown in FIGS. 2, 5 and 6.

The CAN bus is continually monitored for CAN messages which are buffered internally. The monitoring rate can be set as a fraction of the master sampling rate. When a CAN message is received by the interface hardware an interrupt is generated 300 and the message read and filtered 310. If the message is included in the predefined specification then it is stored in local buffers, one for each CAN message ID, otherwise it is discarded.

At the sample rate, i.e. when the sample clock tick occurs, each message in the specification list is checked to see whether a new message has been received since the last clock tick. If it has, the message specification is used by a message splitter 160 of the CANStaq 40 to split 320 the messages into their component signals based on the predefined message specification obtained from the users CAN database. This is the opposite direction but similar to the operation of the message builder. The CAN signals are split out and converted 330 into normalised signals by masking, bit shifting and scaling based on this data obtained from the user's CAN database to produce normalised signals.

The normalised signals are then copied 340 into the acquisition buffer ready for transfer 350 to the computer running the RS Labsite software application, over the Ethernet connection. This transfer is performed when a set number of vectors have been collected. Only the most recent message having any particular message ID is buffered, such that if more than one message with the same ID is received before the next sample period, only the most recent of those received messages will be stored. The normalised signals are then accessible to other system components such as data loggers 360 and other components that allow actions to be performed in response to received CAN messages, for example issuing a CAN message in reply.

A feature is also provided to allow the application computer to be informed when certain CAN signals have been received. CAN messages can be preformed on the application computer and sent to the system for scheduling onto the CAN bus directly. This provides a handshaking mechanism to allow the user to perform complex programmable logic control (PLC) applications. Although it is known for test rigs that are used for automobile testing to implement a PLC startup sequence, it has previously been difficult to fully set up a test vehicle's on board computer within a laboratory environment. By communicating data such as control signals over a CAN bus, it is now possible to simulate operations such as an ignition key startup sequence, or to simulate a user switching to "sport mode", for a test specimen vehicle while positioned on a test rig within a laboratory. By communicating state information onto a CAN bus during initialisation and playback modes of operation, conditions and events that were experienced during actual field trials such as test drives can be reproduced conveniently and accurately, and control signals generated within a test-driven vehicle can be played back to a test specimen vehicle within a laboratory setting synchronously with the data representing conditions and events such as loads and displacements experienced during a test drive.

The CANStaq microcontroller also has the capability of triggering events, such as a dynamic ramp down on the Labtronic 8800 controller, in response to specific CAN signal conditions. For example, this can be used to return the system to a park position if CAN signals exceed specified bounds.

The invention claimed is:
1. A method of testing specimen vehicle components, comprising the steps of:
   storing first data representative of conditions experienced by a vehicle, and/or representative of the action of components of a vehicle during a test drive of the vehicle, wherein the vehicle includes a digital processing device and a vehicle data bus, the digital processing device generating control signals during vehicle operation and communicating the control signals to components of the vehicle via the vehicle data bus;
   storing second data representative of the control signals generated by the digital processing device and communicated to the vehicle data bus during the test drive;
   replaying the first data and applying the first data to equipment to simulate a test drive for a vehicle under test;
   replaying the second data and applying the second data to the vehicle data bus;
   synchronizing the steps of replaying of the first data and replaying the second data;

buffering data representing monitored control signals generated by the digital processing device of the vehicle during the test drive and associated with representative monitored conditions or component actions;

generating data bus signals from the buffered data, and saving the generated data bus signals, representing monitored control signals generated by the digital processing device of the vehicle during the test drive and associated with respective monitored conditions or component actions, to await a trigger signal; and in response to the trigger signal, associated with playback to the test system of data representing monitored conditions or component actions, initiating playback to the test system of said generated data bus signals synchronously with the playback of data representing associated conditions or component actions.

2. The method of claim 1, wherein the trigger signal comprises an interrupt signal that is sent via a high speed communication mechanism from a test-controlling application program to a controller that implements replay of generated data bus signals, the interrupt signal being sent simultaneously via a high speed communication mechanism to a data processing system holding the data representing conditions or component actions, to trigger synchronous replay of said data representing respective associated conditions or component actions.

3. The method of claim 2, wherein the high speed communication mechanisms comprise fiber optic links.

4. The method of claim 2, further comprising repeatedly resynchronising clocks within the controller and within the data processing system holding data representing conditions or component actions.

5. The method of claim 1, wherein the replaying of data representing monitored data bus signals comprises transmitting controller area network (CAN) messages onto a controller area network (CAN) bus within a specimen automotive apparatus.

6. The method of claim 1, wherein the step of generating data bus signals comprises combining into a single controller area network (CAN) message input data representing monitored data bus signals that are sampled in the same clock cycle.

7. The method of claim 6, wherein the step of saving the generated data bus signals further comprises scheduling and prioritisation of controller area network (CAN) messages.

8. The method of claim 3, further comprising repeatedly resynchronising clocks within the controller and within the data processing system holding data representing conditions or component actions.

* * * * *